United States Patent

Nanny

[11] 4,080,799
[45] Mar. 28, 1978

[54] MECHANICAL PIPE END SEAL/ALIGNMENT DEVICE

[75] Inventor: Walter C. Nanny, Houston, Tex.

[73] Assignee: Shell Oil Company, Houston, Tex.

[21] Appl. No.: 754,142

[22] Filed: Dec. 27, 1976

[51] Int. Cl.² ............................................. F16L 1/00
[52] U.S. Cl. .................................... 61/110; 29/281.6; 29/407; 29/429; 138/93
[58] Field of Search ............... 61/109, 110, 111, 112; 29/429; 138/89, 93

[56] References Cited

U.S. PATENT DOCUMENTS

| | | | |
|---|---|---|---|
| 3,834,169 | 9/1974 | Abbott | 61/111 |
| 3,890,693 | 6/1975 | Eagleton et al. | 61/111 X |
| 3,977,201 | 8/1976 | Bittner | 61/112 |
| 3,978,678 | 9/1976 | Duncan et al. | 61/112 |
| 4,011,620 | 3/1977 | Southgate | 61/112 X |

Primary Examiner—Jacob Shapiro

[57] ABSTRACT

A multi-purpose pipe end seal/alignment device is provided for sealing pipe ends against internal or external pressure while protecting the pipe end preparation from damage to facilitate a permanent pipe joining process at a remote location in an adverse environment.

3 Claims, 5 Drawing Figures

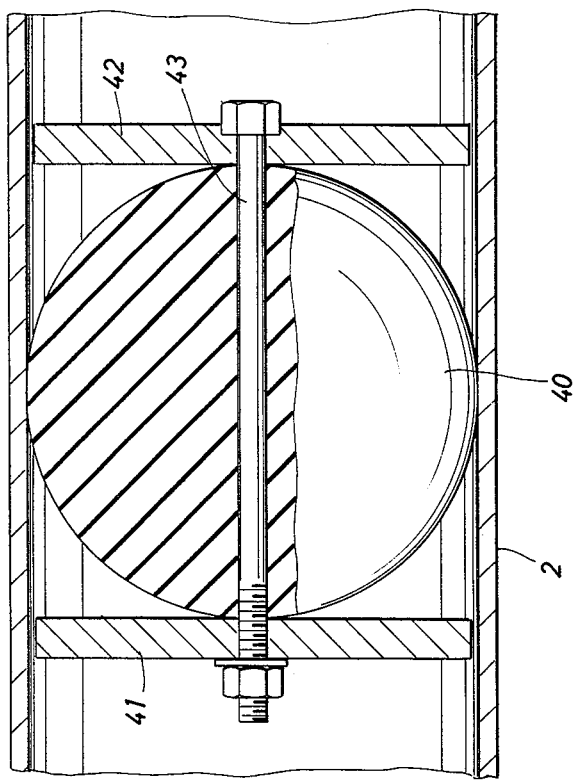
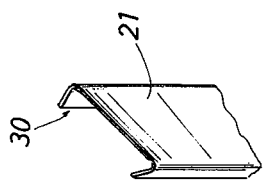
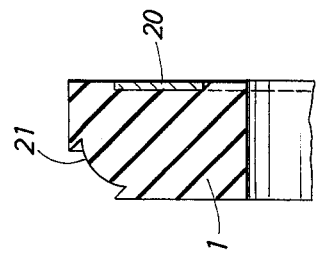
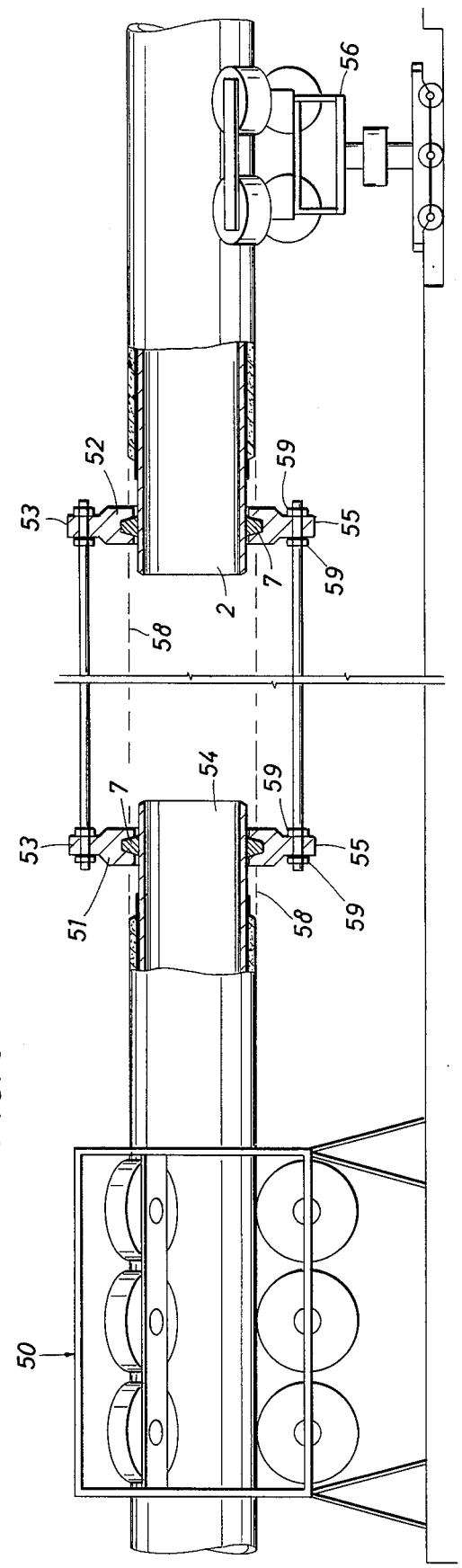

MECHANICAL PIPE END SEAL/ALIGNMENT DEVICE

BACKGROUND OF THE INVENTION

The methods commonly used to cap a pipe end for testing, evacuation, displacing, pulling or submerging a number of end-joined pipes; i.e., a pipeline, include a weld cap, a weld and blind flange assembly, a scraper trap type closure device, or in some cases an expandable plug, modified as required for the particular pipeline installation application. With the exception of the expandable plug, which is primarily for line test and evacuation applications, all of the above-described cap systems require pipeline quality alignment, welding, cutting and rebeveling of the pipe end for line extensions or tie-ins. Accordingly, these prior art systems are both cost and labor intensive. In addition, pipe sizes and lengths are becoming increasingly large, installation areas are more remote and difficult, and material, delay penalties, and other associated cost factors are becoming increasingly greater, particularly in the marine activity areas. There is a substantial need in the art for an improved, time sensitive and more flexible system of securing combinations of pipe end seals, pipe end protections, and assisting pipe end alignments for joining.

SUMMARY OF THE INVENTION

The mechanical pipe end seal/alignment device of this invention provides the flexibility for testing, evacuation, displacing, pulling and/or submerging a number of joined pipes, as well as facilitating the pipe end aligning end joint for a tie-in to extend previously installed pipeline segments.

More particularly, the present invention provides a mechanical pipe end seal comprising, in combination, an edge-tapered pipe end cap provided with an elastomer ring seal engaging and protecting the end periphery of the pipe; an edge-tapered pipe slip-on ring, or series of lugs, arranged for connection to the pipe outer periphery by encirclement welds; and an inside tapered-hinged closure device arranged to engage the tapered edges of the end cap and slip-on ring which thereby positions the ring between the pipe and the seal-retained closure cap when the ends of the hinged closure device are drawn together and become tightened, thereby securely and uniformly compresses the elastomer seal against the pipe end. The end seal system also is provided with an additional means of preserving internal pressure as well as maintaining a water-tight integrity upon submergence for a long-distance tow transport.

Further, the present invention provides an external type of mechanical pipeline tie-in assembly comprising, in combination, two draw assemblies adapted to grip the slip-on ring means disposed on the outer periphery of the proximate ends of separate pipes; pipe cradles configured to provide multi-planar control so as to permit drawing of the pipe ends into center alignments; studs or cylinder actuators engageable with the draw assemblies; and means to pull or push the draw assemblies by the studs or actuators. The seal-retained closure cap and the inside-beveled encirclement ring will have been previously removed but are capable of rapid re-installation in an emergency-abandonment procedure.

The invention also provides a method for preserving and protecting, as well as mechanically sealing, a normally-prepared pipe end such as a beveled weld face so as to permit a hydrostatic or pneumatic test of the sealed pipe without damaging the prepared pipe end. The mechanical end seal coupling may be used repeatedly, and in the event of damage to the elastomer seal, requires only the servicing or simple replacement of the elastomer ring seal within a bolt-mounted seal retainer ring. A supplementing end seal is also capable of being readily installed for purposes of maintaining a positive internal pressure, or for maintaining the water-tight integrity of the pipe internals, should the primary seal mechanism be released.

Accordingly, by the above-described apparatus and method, the present invention overcomes the above-noted problems of the prior art, and provides multi-purpose capabilities and other improvements as will be more particularly described hereinafter.

DESCRIPTION OF THE DRAWINGS

FIG. 2 discloses the elastomer ring seal in a de-energized mode.

FIG. 3 discloses a metallic bellows insert to the elastomer ring seal.

FIG. 4 depicts an alternate-type end secondary pressure seal which is a compressed sphere.

FIG. 5 depicts a pipe end drawup alignment mode.

DESCRIPTION OF PREFERRED EMBODIMENTS

Figure 1:
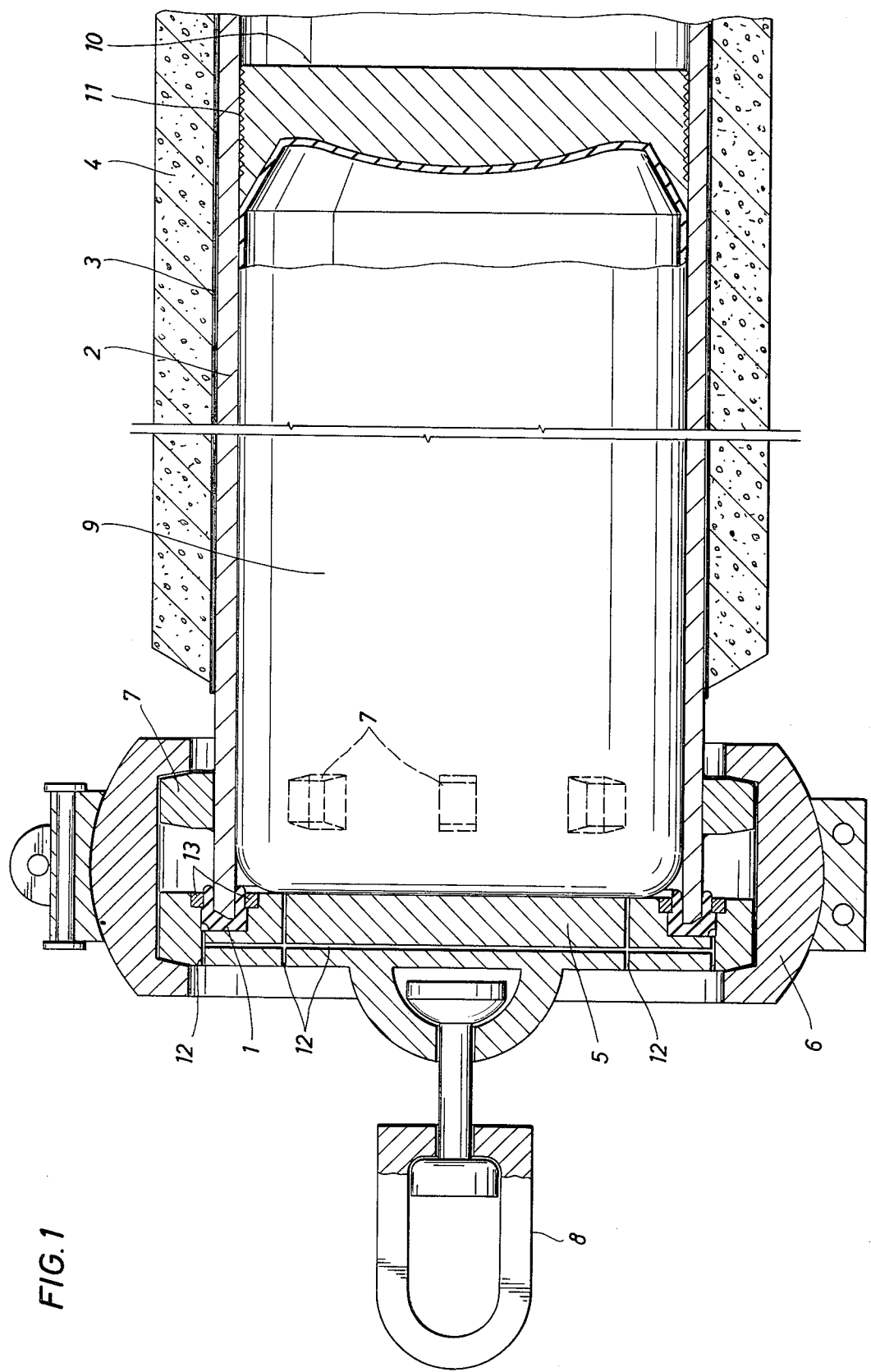
FIG. 1 discloses a cutaway view of a submersible pipeline pull cap fitted with a secondary inflatable-bag type pressure seal.

The mechanical pipe end seal/alignment device, described hereinafter, is a multi-purpose tool for the primary use of sealing pipe ends against internal or external pressures while protecting the pipe end preparation from damage to facilitate the permanent pipe-joining or tie-in process at a remote location in an adverse environment. The device concept is to satisfy a plurality of repetitive pipeline installation demands in a positive, rapid, effective and cost-sensitive manner. The plurality of applications include pipe internal pressure testing; preventing encroachments of pressure when the pipeline is submerged for transport; facilitating pipe end alignments and gap spacements for tie-ins; and providing a quick, mechanical means of reacquiring a pipe end seal in the event of an emergency. It is desirable to provide a removable, reusable and readily field-repairable pipeline mechanical end seal which preserves the pipe end bevel or similar preparation and to efficiently handle the full range of testing sequences such as passage of line-gaging pigs, passage of line-fill pigs, venting the pipeline, hydrostatic internal pressure tests, and passage of line displacement or dewatering pigs.

A further application of the present invention includes pipeline pull segment transfer. When long pipeline assemblies are required to be pulled from an assembly and pretest area to a remote pipeline tie-in point such as required in offshore, water-course crossings and swamp or marsh environments, the mechanical end seal device, such as utilized in the pipe internal pressure testing above described, is fitted with an external pull point swivel eye and an inflatable air bag or mechanically-drawn internal pipe plug or sphere-shaped device to serve as a secondary backup seal and thus assure preservation of the pull segment watertight integrity or bouyancy specification. The secondary end seal device may also be utilized in an on-bottom placement sequence to maintain a positive internal pipe pressure so as to protect the pipe from ovalling due to excessive bending stresses as well as to prevent line fill encroachment of a pipe joining area.

Still another application of the invention pertains to pipeline segment tie-in and on-bottom placement. Securing or maintaining the alignment and gap spacing of large-diameter pipe ends of long pipeline sections is a difficult and time-consuming task. The pipeline end sealing device, as described in the above two applications, may be removed to expose the undamaged pipe joining surface such as a weld bevel preparation, and the edge-tapered pipe slip-on ring, or weld-on lugs, or packer-type ring. The pipe slip-on ring assembly may then be utilized on some applications to facilitate the center alignment and spacement of the undamaged pipe end with a previously-installed pipeline end which may or may not be similarly fitted. With the assistance of pipe breakover and aligning jack cradles, the slack pipe end may be drawn up through a pair of oversize bisected, hinged and bolted, or cylinder actuated, slip-over flanges mounted to encapsulate the edge-tapered pipe slip-on ring. Additional ports would be provided in the slip-over flanges to permit installation of additional bolt studs and nuts, or cylinder actuators, to maintain continuous pipe end positioning as the tie-in weld encircles the pipe. Upon tie-in completion, the alignment assembly is removed for weld inspection, corrosion protection and on-bottom installation. The edge-tapered slip-on ring would preferably remain on the tie-in joint since its outside diameter, in most applications, would not exceed the outside diameter of pipeline weight coat jacketing. Additionally, in some deepwater applications, the slip-on rings would reinforce and stiffen the tie-in joint against buckling and also serve to limit the propagation of a pipe collapse failure.

Particularly in the offshore environment, weather deteriorations can develop rapidly and to a point where a pipeline installation process must cease and require the pipe end to be resealed and placed on bottom in a temporary emergency-abandonment procedure for protection of the installation crew and equipment as well as the uncompleted pipeline. Subsequently, the pipeline end must be relocated and recovered for the resumption of the installation process. The mechanical end-closure system of the present invention provides an invaluable equipment addition for this type of operation.

Some normal offshore pipeline installation procedures, particularly in platform approach areas, require temporary on-bottom pipeline placements for purposes such as surface equipment reorientation, and/or the installation of ancilliary pipeline connection assemblies, and the subsequent end recovery in order to complete the installation process. The mechanical end-closure system of the present invention also provides a simple, rapid and reliable method of facilitating a temporary pipeline on bottom placement and later recovery.

Having above generally described the invention, the following more particularly describes the invention with reference to the accompanying drawings. FIG. 1 provides a cutaway view of the pipeline mechanical end seal device arranged for a submersible pipeline transport. An elastomer seal 1 engages the end periphery of the pipeline segment 2 having an end bevel for welding, an external corrosion coat 3, and in most cases, a concrete weight (or protective) jacket 4. The elastomer ring seal is contained in an edge-tapered pipe end closure cap 5 which will cover pipe 2 and press seal 1 against the pipe when energized. An inside-tapered device 6, shown in an energized mode, is adapted to also engage the edge-tapered slip-on ring lug assembly 7, or alternatively, slip-on ring (not shown) or a mechanical packer (not shown). The mechanical pipe end seal device may also be equipped with a swivel-type pipe pull eye 8 for use as above described in pulling the pipe to remote locations. An inflated elastomer bag to serve as a pipe end secondary seal 9 is disposed internally of the pipe within the vicinity of the end seal. Bag 9 may be fitted with a reinforced bag stiffener 10, or stiffeners, shown at the opposite primary seal end, in this arrangement which may be bonded or fused to the elastomer bag at one or both, and which is also shown in an arrangement with stiffener serrations 11. The bag, fitted with one or more serrated stiffeners, are intended to provide a backup or secondary seal protection against leaks into the pipe by externally-applied pressure, such as could occur during offshore towing of the pipe end, and also to separately provide a means of maintaining a positive internal pressure when needed to resist pipe ovalling stresses due to external pipe pressure or to prevent a line fill encroachment of a pipe joining area. Energizing ports 12 are provided in the edge-tapered closure cap 5 where hydraulic fluid or grease may be admitted to pressurize the ring seal 1. Ring seal retainer ring 13 function in cooperation with the pressurizing fluid to further seal the lips of the seal around the beveled end of the pipe to provide seal-keeping capabilities and to permit a rapid field replacement of the elastomer ring seal.

Elastomer ring seal 1, shown in an energized position in FIG. 1, is shown in FIG. 2 in a de-energized position. A reinforced wear surface 20 is provided to fit about the beveled end of the pipe and thereby prevents excessive seal wear replacement and the inadvertent piercing of the seal by the pipe end. A ring seal bellows metallic insert 21, insertible into the elastomer ring seal for admission of hydraulic fluid, grease or other pressurizing mechanism, is more particularly shown in FIG. 3. The bellows insert has a curved edge 30 which fits into corresponding grooves 22 in the ring seal 1.

In FIG. 4 is shown an alternate pipe end secondary seal which may be substituted for inflated elastomer bag 9 shown in FIG. 1. Sphere 40 is compressed between undersized blind flanges 41 and 42, pulled together by threaded bolt 43 into sealing engagement with pipeline segment 2. The pipe end drawup alignment depicted in FIG. 5 is illustrative of a surface-type connection of two pipelines aboard a lay barge. Other representations which are not shown may also include a subsurface connection of two submerged pipelines, an on-bottom connection of two pipelines on the seafloor, or an on-bottom connection of a pipeline to a fixed platform riser assembly.

FIG. 5 discloses a pipe end drawup alignment mode for the present invention which is shown in a surface-type connection arrangement. In accordance with this part of the invention, there is provided a suspended pipeline tensioner 50 of the type utilized offshore for holding a prescribed tensile force on a suspended and submerged pipe segment of a pipeline. The pipeline tensioner 50 generally resides in a fixed or lockable position on a lay barge. Conventionally, the weld cap on the segment which is to become affixed to the tensioned-submerged pipeline segment must be removed with a cutting device and the end of the pipe must be beveled, or otherwise prepared for joining, and then brought together with the end of the pipeline for welding or other joining process. Due to the lay barge reaction to pitch, heave, yaw and roll, it is difficult to accomplish this operation and to bring the end of a long multi-joint segment into the specified alignment tolerance with a fixed pipe end so that they may be welded or otherwise joined together. However, in accordance with the present invention, there is provided a mechanical pipeline tie-in assembly which includes draw (or push) assemblies 51 and 52 of the clamp-on type which are adapted to encapsulate and grip lugs 7, or slip-on rings or mechanical packers as above described, which are disposed on the outer periphery of the proximate ends of the separate pipelines 2 and 54. Pipe alignment cradles, one of which is shown (cradle 56), is provided with three-dimensional adjustment and the suspended pipeline tensioner 50 are adapted to bring the ends of the pipelines together whereupon studs 57, actuated cylinders or other means, are engaged with the draw (or push) assemblies and utilized to space the center-aligned pipe end assemblies so that the pipelines can be welded or joined together. Upon joint inspection and approval for installation, an outer concrete or mastic encasement of the tie-in joint 58 may encapsulate the lugs 7, or rings above described, so that they need not be removed from the pipe after the welding operation. Studs 57 fit into split-ring hinges 53 and split-ring fasteners 55. Clamp flanges 51 and 52 are provided with multi-stud ports for a continuous tie-in process whereby the pipe ends can be brought progressively into spacial alignment by tightening the outer or inner nuts 59 so as to securely fix and maintain the pipe ends at the prescribed relationship throughout the joining procedure.

I claim as my invention:

1. A method for joining a pipe segment to an offshore pipeline while maintaining pressure in the pipeline to protect it from buckling stresses arising from external pressure and bending, and to protect the joining environment, comprising:

maintaining pressure in the pipeline by sealing it with an expandable insert;

joining the pipe segment to the pipeline; and transporting the expandable insert through and to the free end of the joined pipe segment by overcoming the sliding friction resistance of the expandable insert by relatively adjusting the pressure exerted by the expandable insert and the pressure inside the pipeline.

2. The method of claim 1 wherein the pipeline is further pressured to move, or transport, the expandable insert.

3. The method of claim 1 wherein pressure exerted by the expandable insert on the pipeline is reduced to allow the insert to move.

* * * * *